(12) United States Patent
Kamm et al.

(10) Patent No.: US 8,004,754 B2
(45) Date of Patent: Aug. 23, 2011

(54) IMAGE GENERATING APPARATUS

(75) Inventors: Markus Kamm, Karlsruhe (DE); Zoltan Facius, Kernen (DE); Nadin Roesler, BP Eindhoven (NL); Olivier Ripoll, Rueschlikon (CH); Shigeki Hashimoto, Tokyo (JP)

(73) Assignee: Sony Deutschland GmbH, Berlin (DE)

( * ) Notice: Subject to any disclaimer, the term of this patent is extended or adjusted under 35 U.S.C. 154(b) by 663 days.

(21) Appl. No.: 12/037,591

(22) Filed: Feb. 26, 2008

(65) Prior Publication Data
US 2008/0259429 A1  Oct. 23, 2008

(30) Foreign Application Priority Data
Mar. 31, 2007  (EP) .................... 07006770

(51) Int. Cl.
*G02B 17/08* (2006.01)
(52) U.S. Cl. ..................... 359/364; 359/362
(58) Field of Classification Search .............. 359/362, 359/364
See application file for complete search history.

(56) References Cited

U.S. PATENT DOCUMENTS

| | | |
|---|---|---|
| 4,970,546 A | 11/1990 | Suzuki et al. |
| 6,323,984 B1 | 11/2001 | Trisnadi |
| 6,577,429 B1 | 6/2003 | Kurtz et al. |
| 2005/0057727 A1 | 3/2005 | Troyer |
| 2006/0125969 A1 | 6/2006 | Chilla et al. |
| 2007/0291240 A1* | 12/2007 | Hintersteiner et al. ......... 355/52 |

FOREIGN PATENT DOCUMENTS

| | | | |
|---|---|---|---|
| WO | WO 2006/065524 A2 | 6/2006 | |
| WO | WO 2006/065537 A2 | 6/2006 | |

OTHER PUBLICATIONS

J. W. Goodman, "Some Fundamental Properties of Speckle", J. Opt. Soc. Am., vol. 66, No. 11, Nov. 1976, pp. 1145-1150.
Jahja I. Trisnadi, "Speckle Contrast Reduction in Laser Projection Displays", Silicon Light Machines, 7 pages.
Office Action issued Feb. 15, 2011, in Chinese Patent Application No. 200810090044.2, filed Mar. 31, 2008 (English Translation only).

* cited by examiner

*Primary Examiner* — Joshua L Pritchett
(74) *Attorney, Agent, or Firm* — Oblon, Spivak, McClelland, Maier & Neustadt, L.L.P.

(57) ABSTRACT

The present invention relates to an image generating apparatus (1) which comprises an illumination unit (20) having an intermediate face (21, S), as well as an image modulator (30) for generating an image (I). In addition a deflecting means (10) for deflecting a received light beam (L) of primary illumination light (L1) to said illumination unit (20) is provided in order to irradiate said intermediate face (21, S). Said deflecting means (10) is adapted to have—during the process of irradiating said intermediate face (21, S)—said light beam (L) subsequently in time irradiate different portions of said intermediate face (21, S) in order to thereby reduce the speckle effect.

21 Claims, 14 Drawing Sheets

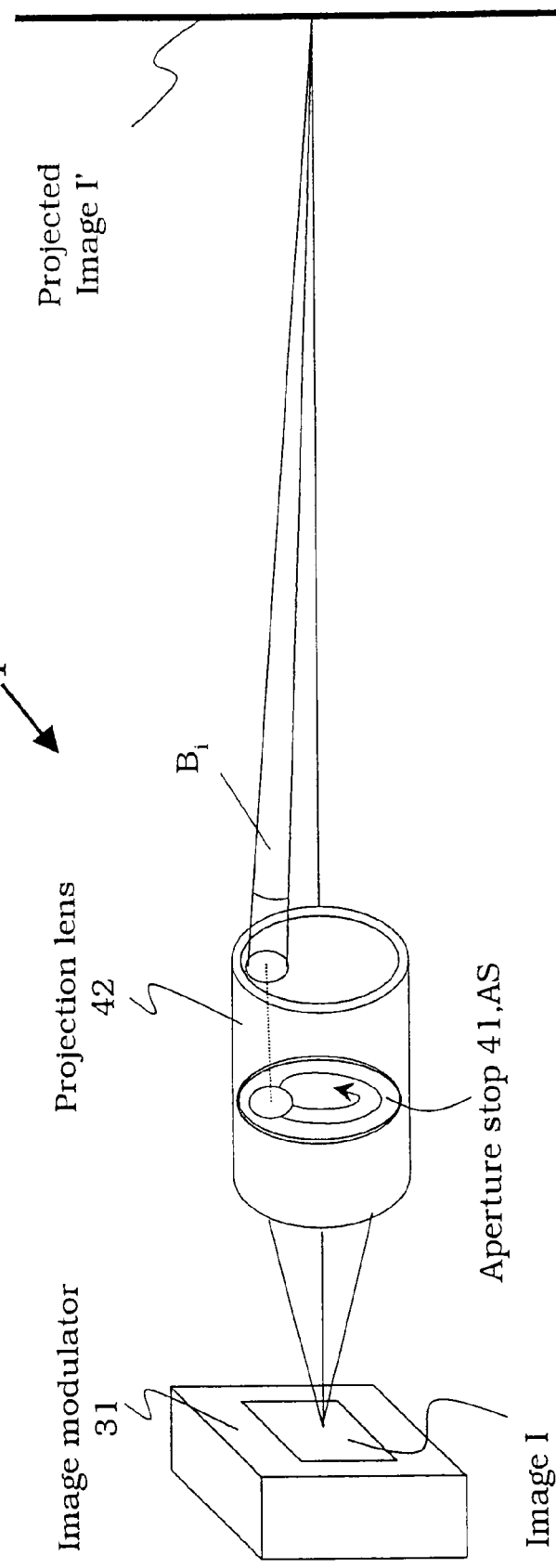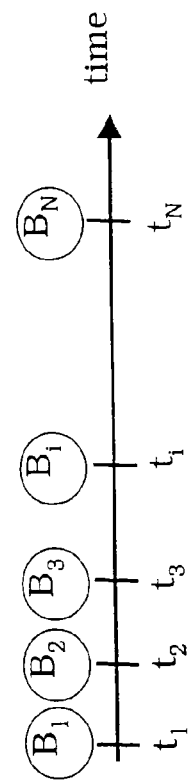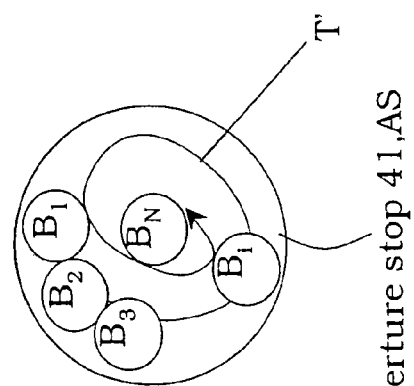
Fig. 4A
Fig. 4B
Fig. 4C

IMAGE GENERATING APPARATUS

FIELD OF THE INVENTION

The present invention relates to an image generating apparatus and in particular a projection apparatus using laser light sources.

BACKGROUND OF THE INVENTION

Nowadays apparatuses and devices for generating images and for projecting the same as well as their miniaturization become more and more important in many customer devices and electronic appliances. The problem of such apparatus and devices—in particular when using light sources which at least to some extent produce or at least involve coherent light—is that in the process of image generation and image projection the produced images contain noise and other inhomogenities which are due to the coherent nature of the involved light. These inhomogenities are in particular caused by interference processes at optical faces, surfaces or interfaces on the one hand. The noise component is usually called speckle and is generated majorly by interference processes, for instance at diffusing faces or interfaces, e.g. at diffusing screens.

SUMMARY OF THE INVENTION

It is therefore an object underlying the present invention to provide an image generating apparatus which is capable of at least reducing the content of inhomogenities and speckle in the produced images.

The object underlying the present invention is solved by an image generating apparatus according to claims 1 and 2. Embodiments and modifications of the image generating apparatus according to the present invention are within the scope of the dependent claims.

According to the present invention an image generating apparatus is provided which comprises means for generating an image, means for illuminating said means for generating an image, as well as means for deflecting a received light beam of primary illumination light having coherence properties to said means for illuminating. Said means for illuminating has an intermediate face. Said means for deflecting said received light beam of primary illumination light is capable of irradiating said intermediate face. According to the present invention said means for deflecting is adapted in order to have—during the process of irradiating said intermediate face—said light beam subsequently in time irradiate different portions of said intermediate face.

It is therefore one aspect of the present invention to provide said means for deflecting said received light beam of primary illumination light having coherence properties with the functionality to have said deflected light beam of primary illumination light subsequently irradiate different portions of said intermediate face of said means for illuminating. As a consequence as time progresses the differently illuminated portions of said intermediate face which are well used for image generation at least to some extent loose their coherency property and are therefore to some extent incoherent with respect to each other as there exist an appear at different time instances. Therefore—because of the lost of coherency—they cannot contribute to the speckle phenomenon anymore.

BRIEF DESCRIPTION OF THE DRAWINGS

The invention will now be explained based on preferred embodiments thereof and by taking reference to the accompanying and schematical figures.

FIGS. 3-4C is a schematical diagram for elucidating the connection of different beamlets with respect to each other and with respect to the speckle pattern in an embodiment of the image generating apparatus according to the present invention.

DETAILED DESCRIPTION OF THE INVENTION

Figure 1A:
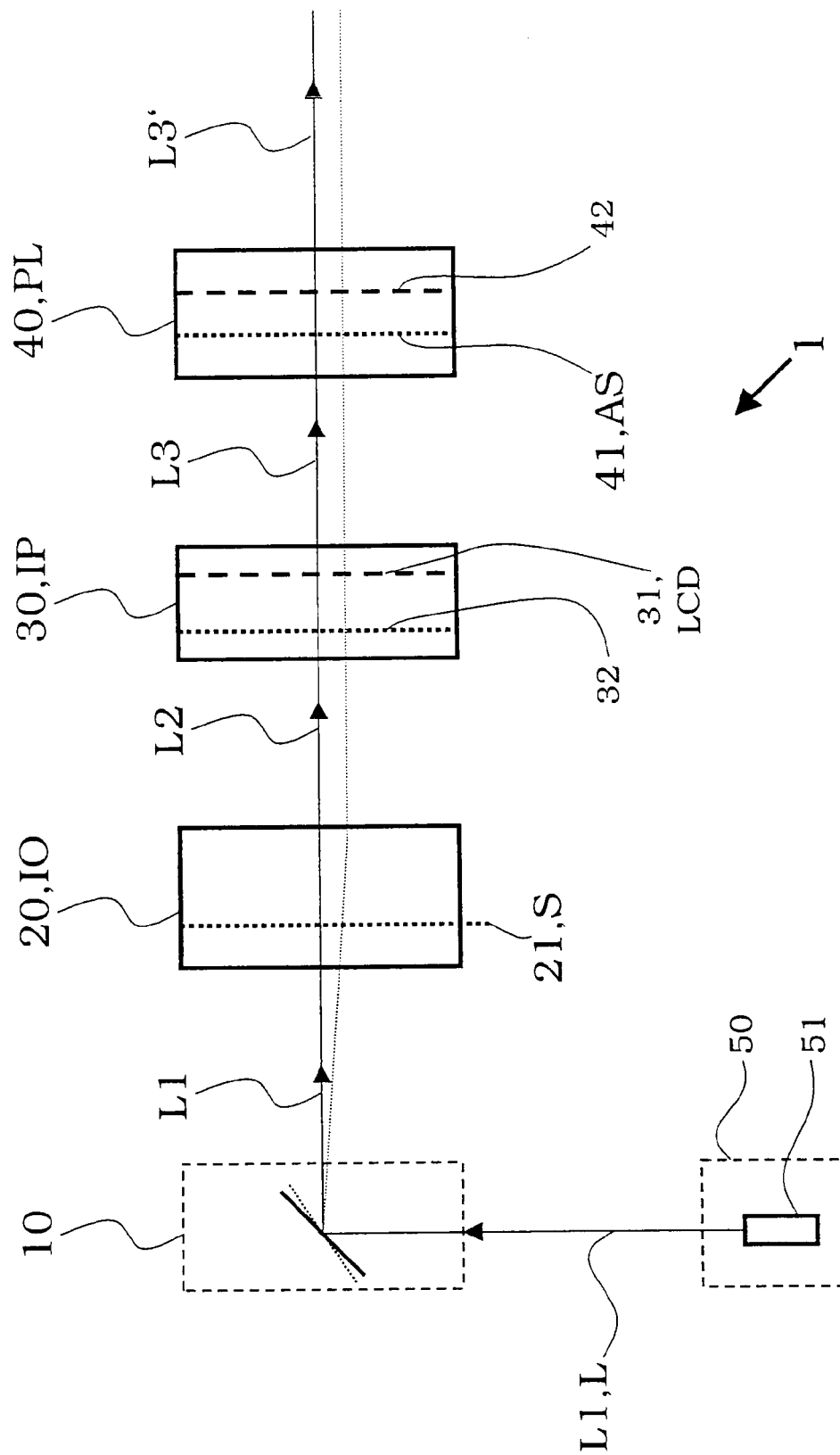
FIG. 1A, 1B are schematical block diagrams of embodiments of the image generating apparatus according to the present invention.

In the following functional and structural similar or equivalent element structures will be denoted with the same reference symbols. Not in each case of their occurrence a detailed description will be repeated.

At first, in the following reference is taken to the Figs. in general:

According to the present invention an image generating apparatus 1 is provided. Said image generating apparatus 1 comprises an image generating panel IP as means 30 for generating an image I, illumination optical means IO as means 20 for illuminating said means 30 for generating an image I having an intermediate face 21, S, which modifies beams L of light in order to illuminate said panel IP uniformly and with a beam shape being congruent to the shape of said panel IP, means 10 for deflecting a received light beam L of primary illumination light L1 having coherence properties to said means 20 for illuminating, in order to irradiate said intermediate face 21, S with said light beam L, and a projection lens PL as means 40 for projecting an image I received from said means 30 for generating said image I, which projects an image displayed on the panel IP, wherein said means 10 for deflecting is adapted in order to have—during said process of irradiating said intermediate face 21, S—said light beam L subsequently in time irradiate different portions Sj of said intermediate face 21, S, wherein said means 40 for projecting an image I having an aperture stop 41, AS, and wherein said intermediate face 21, S of said means 20 for illuminating is positioned in optical conjugation with respect to said aperture stop 41, AS.

On the other hand, according to the present invention an image generating apparatus 1 is provided, which comprises means 30 for generating an image I, means 20 for illuminating said means 30 for generating an image I having an intermediate face 21, S, means 10 for deflecting a received light beam L of primary illumination light L1 having coherence properties to said means 20 for illuminating, in order to irradiate said intermediate surface 21, S with said light beam L, wherein said means 10 for deflecting is adapted in order to have—during said process of irradiating said intermediate face 21, S—said light beam L subsequently in time irradiate different portions Sj of said intermediate face 21, S.

Said means 10 for deflecting may be adapted in order to have—during said process of irradiating said intermediate face 21, S—said light beam L take different positions on said intermediate face 21, S.

Said means 10 for deflecting may be adapted in order to have—during said process of irradiating said intermediate face 21, S—said light beam 1 sweep across said intermediate face 21, S.

Said means 10 for deflecting may be adapted in order to have—during said process of irradiating said intermediate face 21, S—said light beam 1 continuously move across said intermediate face 21, S.

Said intermediate face 21, S may be a surface of said means 20 for illuminating.

Said intermediate face 21, S may be a virtual face within said means 20 for illuminating.

Said intermediate face 21, S may be a face of a screen of said means 20 for illuminating.

Said intermediate face 21, S is a face of a diffuser of said means 20 for illuminating.

Said image generating apparatus may further comprise means 40 for projecting an image I received from said means 30 for generating said image I.

Said means 40 for projecting an image I may have an aperture stop 41, AS.

Said intermediate face 21, S of said means 20 for illuminating may be positioned in optical conjugation with respect to said aperture stop 41, AS. Said means 20 for illuminating or said illumination optical means IO may comprise integrator plates and a condenser lens.

Said intermediate face 21, S may be in vicinity of said second integrator plate 24-2.

Said means 20 for illuminating or said illumination optical means IO may comprise a light pipe and a relay lens system, wherein the intermediate face 21, S is in vicinity to the aperture stop of the relay lens system.

Said means 20 for illuminating or said illumination optical means IO may comprise an additional diffuser which is positioned before or after the deflecting means 10.

Said image generating apparatus 1 may further comprise means 50 for generating primary illumination light L1 which is adapted in order to direct said primary illumination light L1 to said means 10 for deflecting said primary illumination light L1.

Said means for generating primary illumination light L1 may have at least one laser light source 51.

Said means 50 for generating primary illumination light L1 may have an array of laser light sources 51 which is adapted in order to generate and direct a respective array of laser light beams L to said means 10 for deflecting said primary illumination light L1.

Said means 50 for generating primary illumination light may have a focal length and a focal plane and said means 10 for deflecting may be positioned in said focal plane.

Said means 10 for deflecting may be or may comprise a mirror 11.

Said mirror 11 may be adapted for being mechanically rotated or tilted in order to thereby deflect said received light beam L across said intermediate face 21, S.

Said mirror 11 may be mounted in a cardanic manner in order to be tilted around two orthogonal axes and in order to deflect said received light beam in two dimensions across said intermediate face 21, S.

Said mirror 11 may be adapted in order to have said deflected light beam L move across said intermediate face 21, S in one of a circular manner, a linear manner, cyclical manner and a chaotic manner.

Said means 30 for generating an image I may be or may comprise an image modulator.

Said means 30 for generating an image I may be or may comprise at least one liquid crystal display element LCD.

Said means 20 for illuminating may be or may comprise an illumination unit.

These and further aspects of the present invention will be further discussed in the following:

The present invention inter alia also relates to a projection apparatus using laser light sources.

The invention describes the optical part of a projection system using lasers as light sources. Laser illuminated projectors usually generate inhomogeneous and noisy pictures due to the coherent nature of laser light.

The inhomogeneity—which we also call "objective speckle"—is caused by interferences of coherent light at rough surfaces, surface imperfections and aperture stops within the optical system. The speckle pattern appearing on the screen is independent from the viewing conditions of the observer, e.g. it is independent from position, viewing angle or pupil size of the observer.

The noise—which we also call "subjective speckle"—is caused by interference of coherent light with the rough surface or with the diffusing particles of a screen. Coherent light is interfering constructively or destructively when it is scattered into different directions, thereby generating a granulated speckle pattern in the image plane of the observer (e.g. retina of the human eye). The speckle pattern changes ("moves") when the position or viewing angle of the observer is changed.

The speckle phenomenon is described in "J. W. Goodman, J. Opt. Soc. Am, Vol. 66, No. 11, November 1976". Goodman describes also ways to suppress speckle.

It is known that laser speckle can be reduced by the presence of a moving random diffuser or random phase retarder in the optical path, at a point where the laser is focused before the image formation device or at a plane where the image is formed in the optical systems. (see Trisnadi in Proc SPIE 4657, 2002).

The present invention describes the conditions of an optical set-up which reduces both objective and subjective speckle.

Figure 1B:
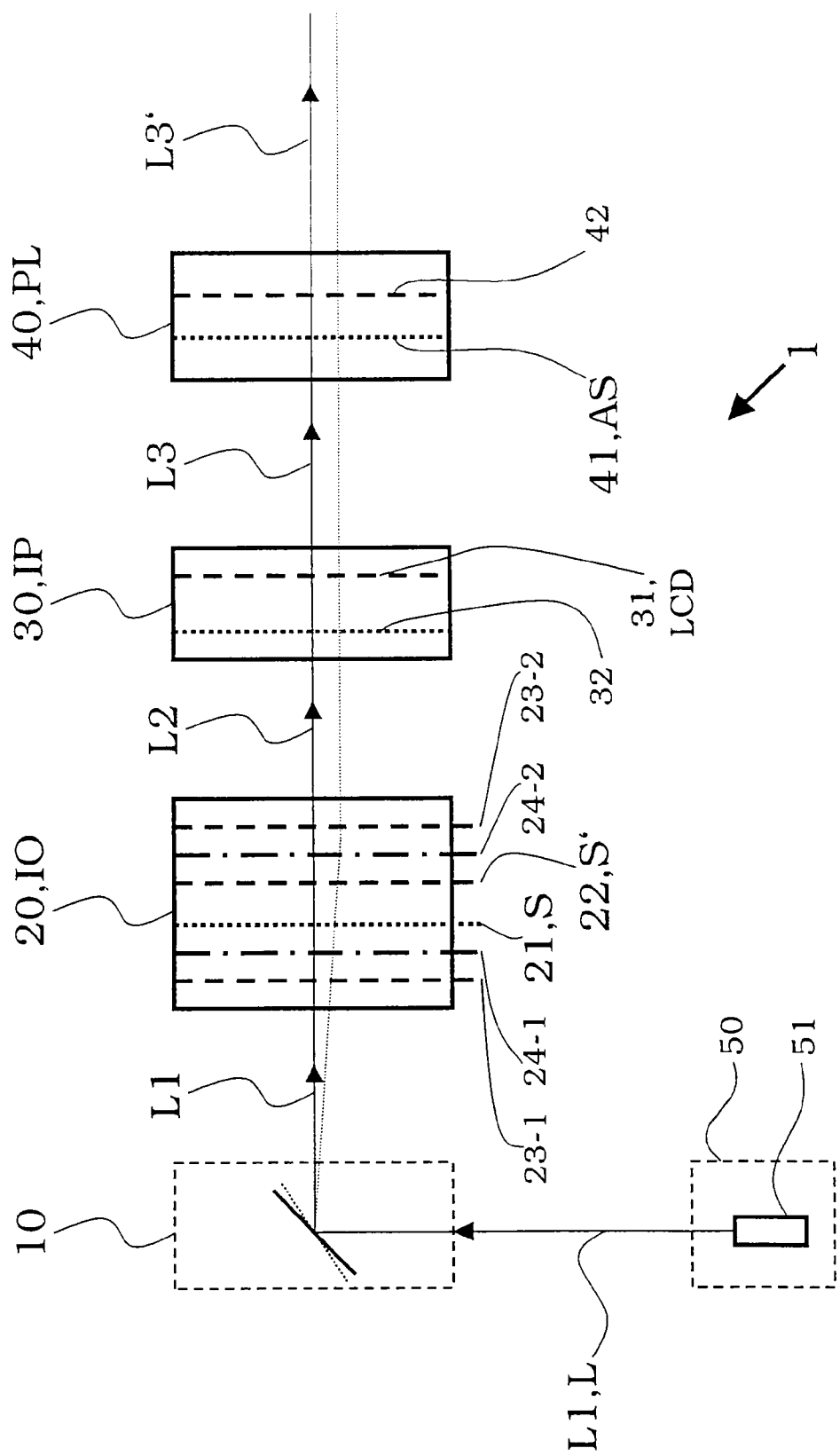
Figure 2:
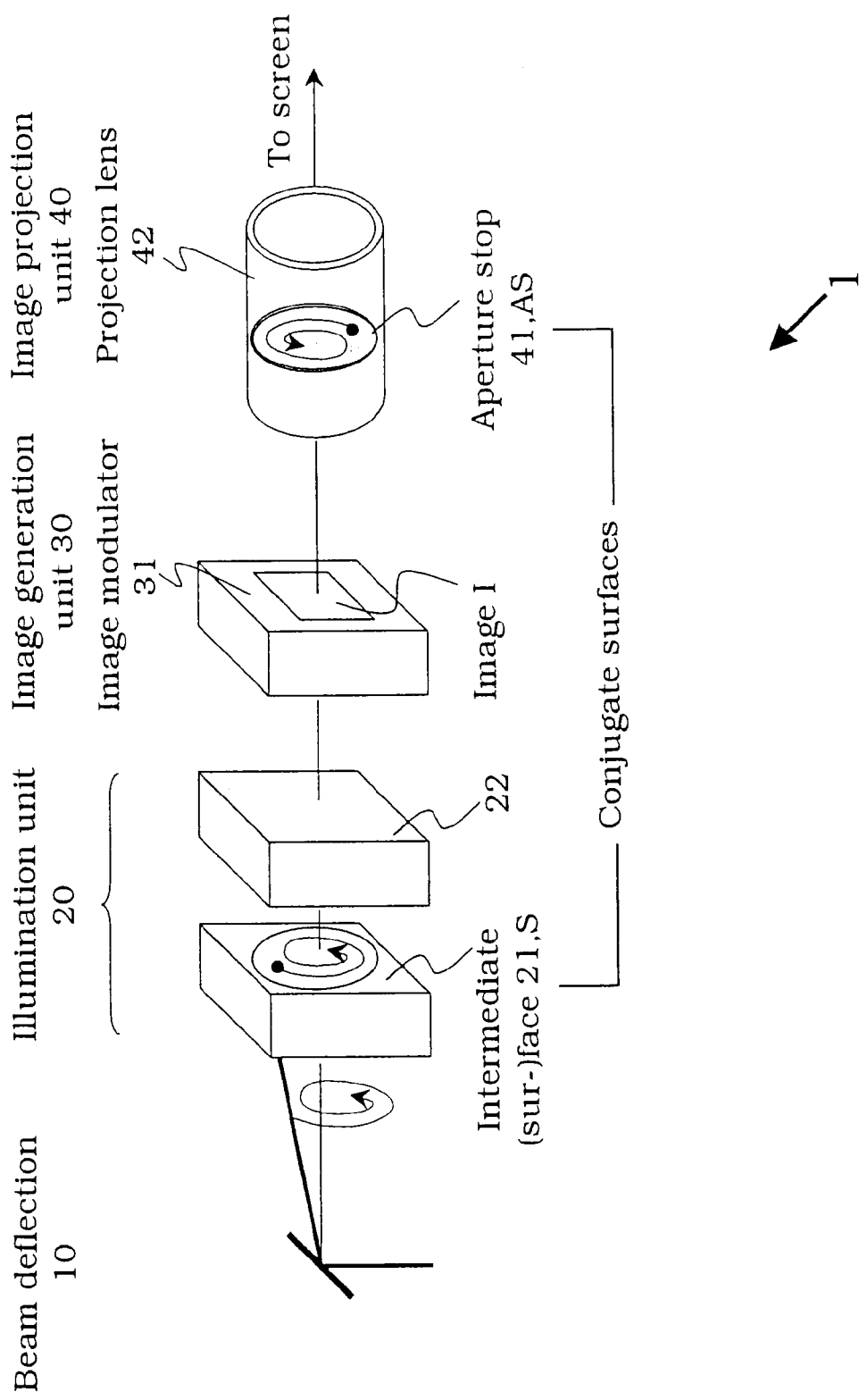
FIG. 2 is a schematical and perspective side view of another embodiment of an image generating apparatus according to the present invention elucidating more constructive details thereof.

As shown in the figures, and in particular in FIGS. 1 and 2, a laser beam L or a set of multiple coincident laser beams or an array of laser beams is deflected, e.g. by use of a mechanically rotating or tilting mirror 11, in order to sweep across an intermediate surface S which is located within the illumination unit 20 of a projector 1 as an image generating apparatus in the sense of the present invention. The beam L can sweep in a circular manner or in a linear manner or any other trajectory T across the intermediate face or surface S. The motion pattern can repeat cyclically or it can sweep chaotically. Optionally a diffuser 22 can be used to blur the laser spot in order to achieve better uniformity.

An image of the intermediate surface S is formed in the vicinity of the aperture stop AS of the projection lens 42, because S and AS are conjugate to each other.

The illumination unit 20 illuminates the image modulator 31, e.g. LCD Panel, of the means 30 for image generation.

The image I is projected in the usual way by means of a projection lens onto the screen.

Figure 3:
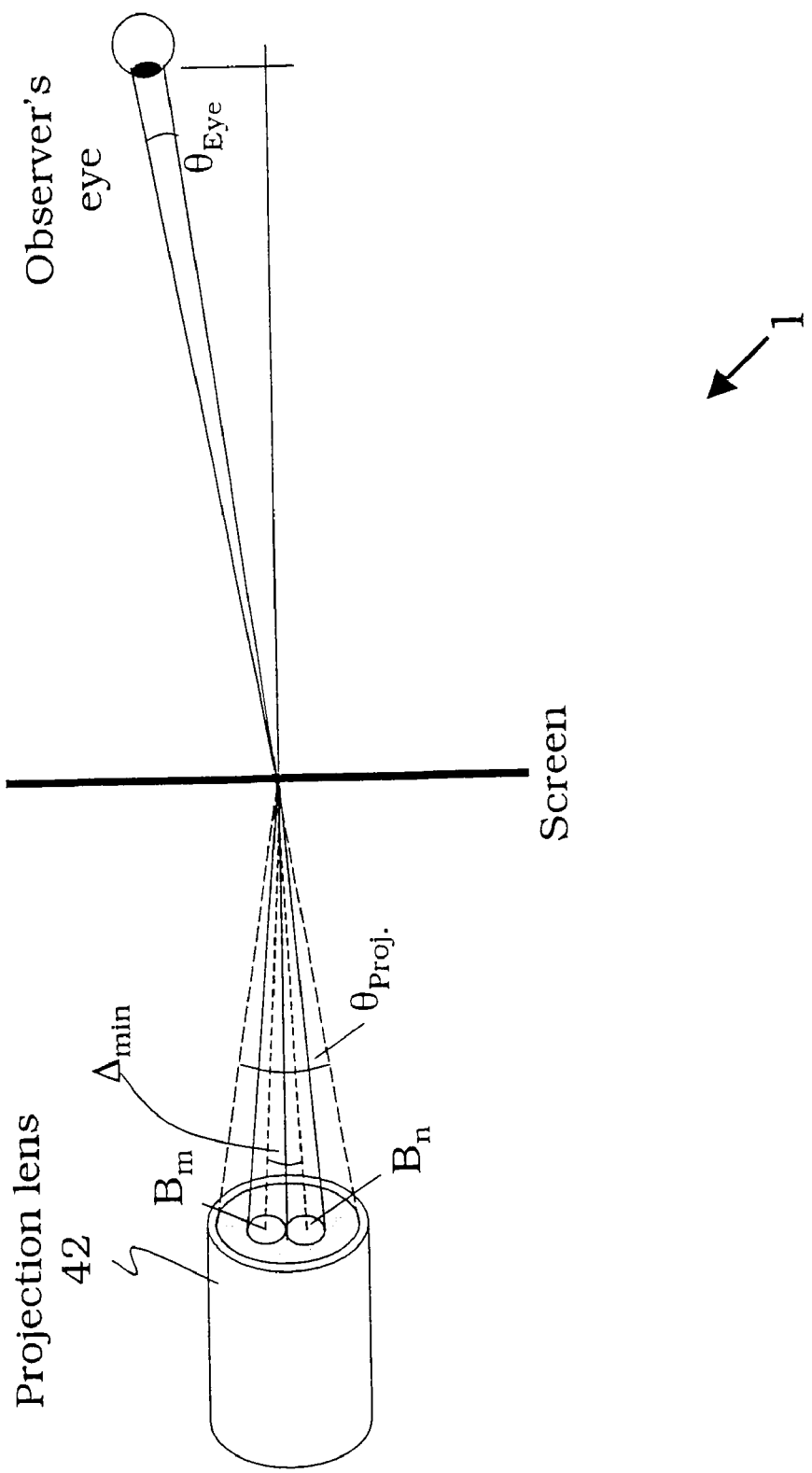

Each beamlet $B_i$ emerging from the projection lens 42 creates a specific speckle pattern on the retina of the observers eye, as can be seen e.g. from FIG. 3.

A certain minimal angular separation $\Delta_{min}$ between each two beamlets $B_m$, $B_n$ is required to make sure that the speckle patterns created by each beamlet are uncorrelated to each other.

$\Delta_{min}$ depends on the wavelength bandwidth, the type of screen, the distance between observer and screen and the size of the pupil of the observer. A typical value found experimentally is $\Delta_{min} \approx 0.5\ \theta_{Eye}$. But other values might be found depending on the specific conditions (bandwidth, . . . ).

Due to the limitation of $\Delta_{min}$ only a limited number of N uncorrelated beamlets can fill the projection cone angle $\theta_{Proj}$.

As is indicated in FIGS. 4A to 4C, the beamlets $B_i$, i= [1, . . . N], are incoherent to each other as they exist (appear) at disjunct times.

As the speckle pattern created by the beamlets are uncorrelated to each other (condition of $\Delta_{min}$) and the beamlets are incoherent to each other (disjunct times), the superposition of all individual beamlets leads to a pattern with speckle contrast reduced by factor $\sqrt{N}$.

Figure 5A:
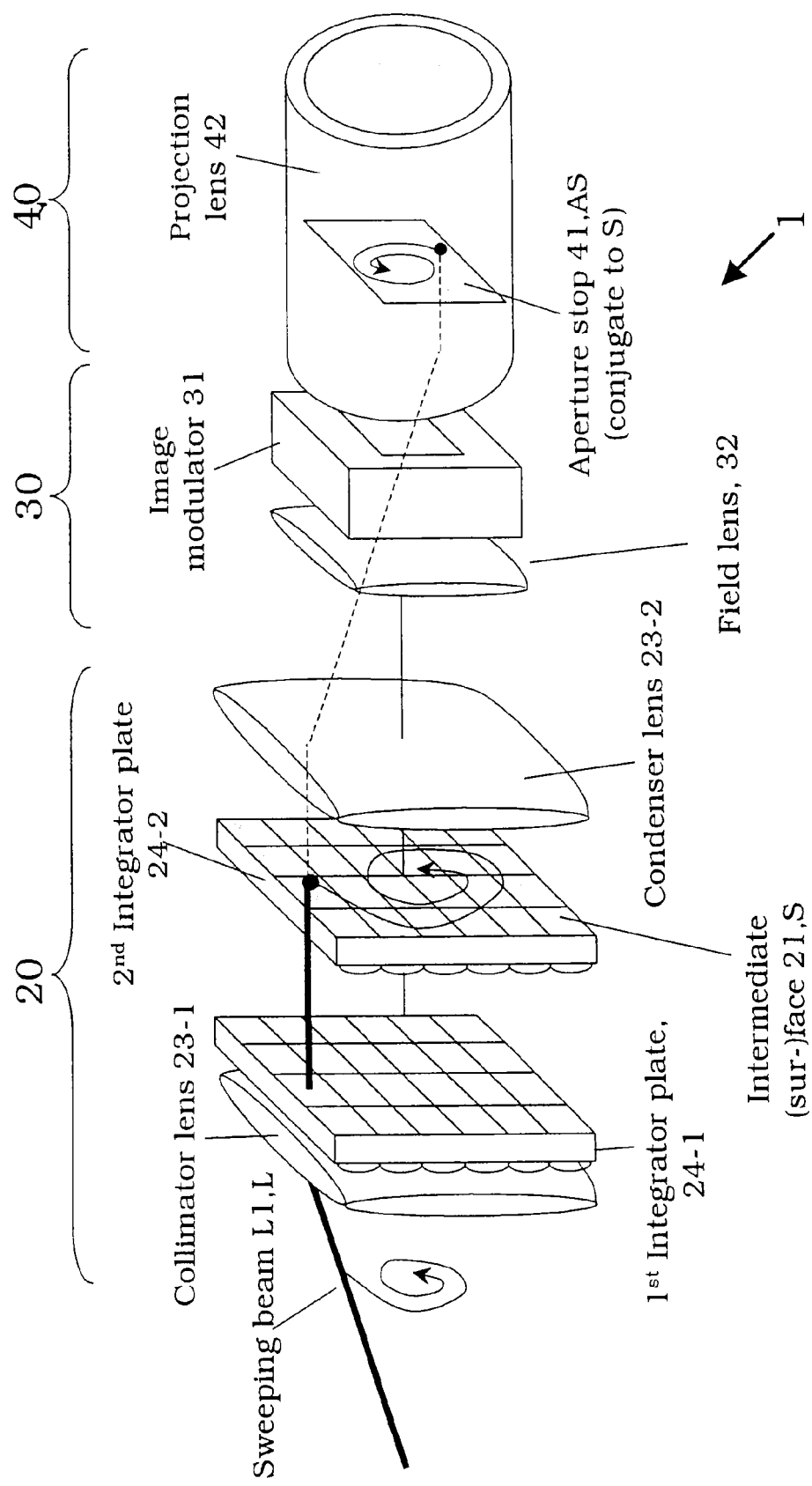
FIGS. 5A-7C are perspective side views and schematical cross-sectional views of further embodiments of image generating apparatuses according to the present invention.
Figure 5B:
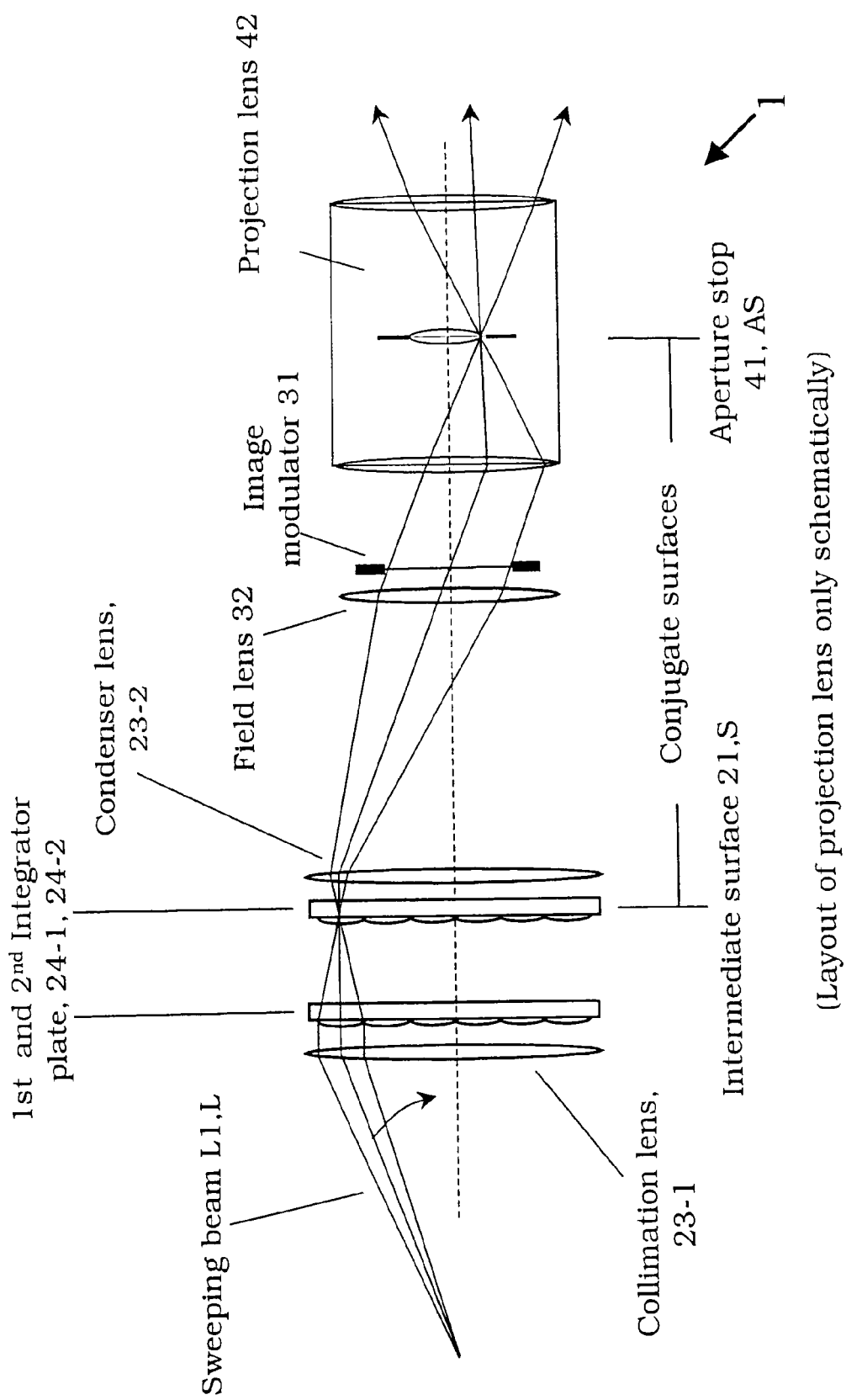

In the embodiment of FIGS. 5A and 5B, integrator plates 24-1, 24-2 are commonly used in the illumination part 20 of projectors 1 in order to illuminate the image modulator 31 homogeneously and with rectangular shape.

The laser beam L or a set of multiple coincident laser beams or an array of laser beams is swept across the collimation lens 23-1 in such a way that the active area of the $1^{st}$ integrator plate 24-1 is partially or entirely covered. An optional diffuser 22 placed between the mirror 11 and the $1^{st}$ integrator plate 24-1 can be used to blur the laser spot in order to improve the uniformity.

The $2^{nd}$ integrator plate 24-2 is in conjugate position to the aperture stop 41, AS of the projection lens 42. As a result light sweeps in a similar (but inverted) way across the aperture stop 41, AS like it sweeps across the $2^{nd}$ integrator plate 24-2.

Figure 6A:
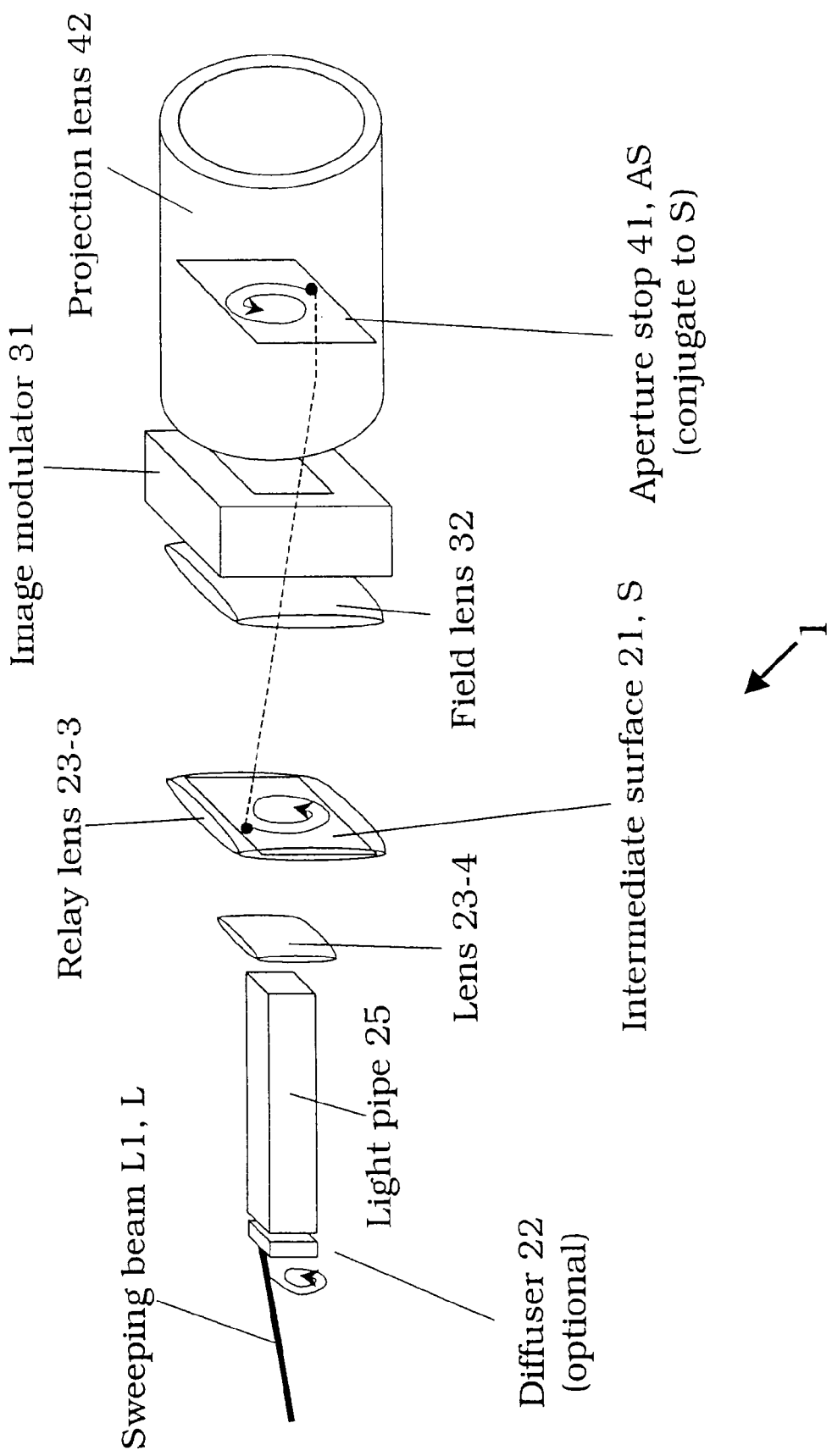
Figure 6B:
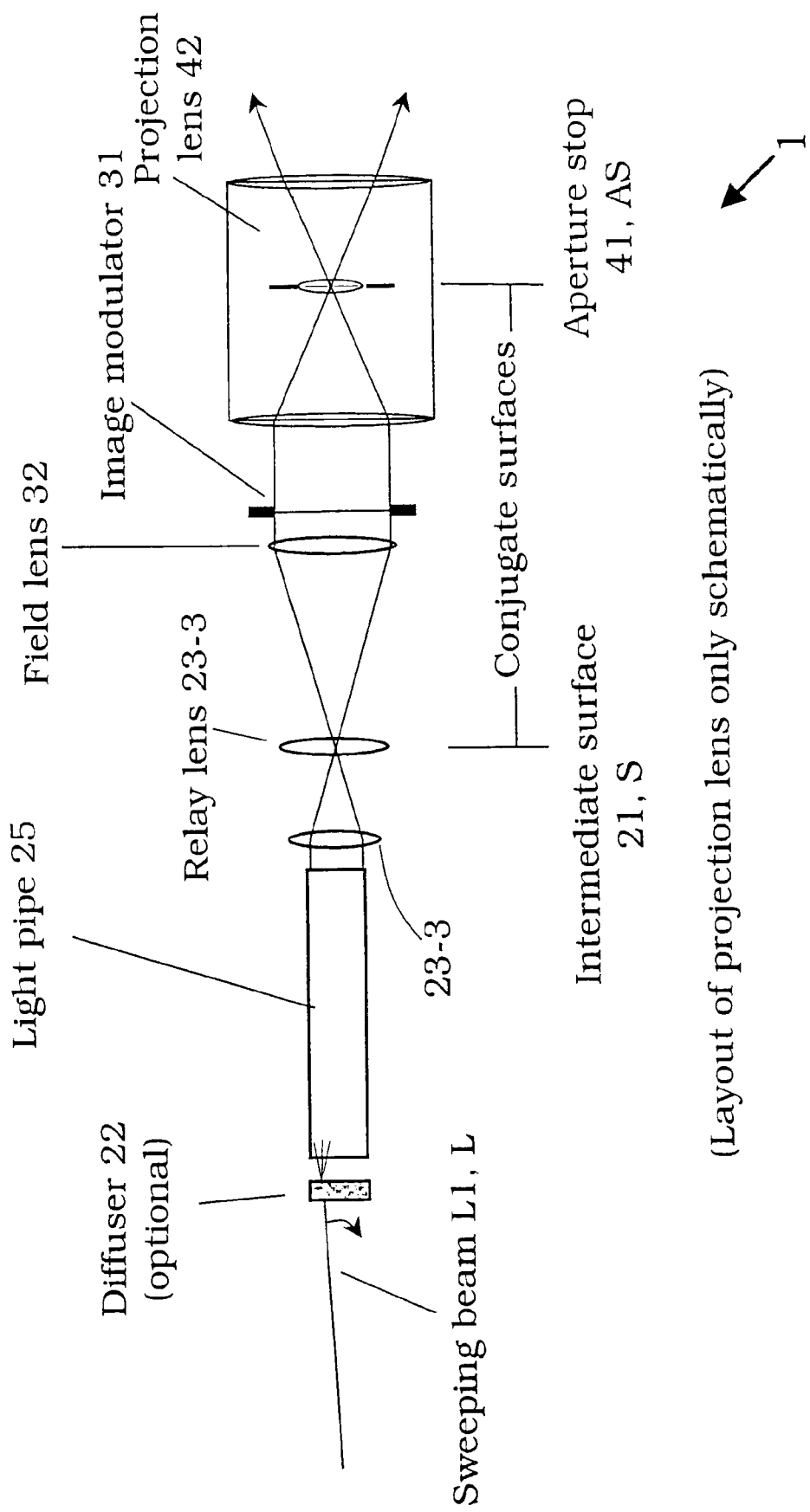

In the embodiment of FIGS. 6A and 6B, a light pipe illumination with a light pipe 25 is used in order to illuminate the image modulator 31 homogeneously and with rectangular shape.

The laser beam L or a set of multiple coincident laser beams or an array of laser beams is swept across the entrance of the light pipe 25 in such a way that the entrance area is partially or entirely covered. An optional diffuser 22 in front of the light pipe 25 can be used to blur the laser spot and to improve the uniformity. The exit surface of the light pipe 25 is imaged by a relay lens 23-3 to the image modulator 31. The relay lens 23-3 is in conjugate position to the aperture stop 41, AS of the projection lens 42. As a result light sweeps in a similar but inverted way across the aperture stop 41, AS like it sweeps across the relay lens 23-3.

Due to the multiple internal reflections inside the light pipe 25 the light trajectory T of the light spot across the relay lens 23-3 is different to the trajectory of the light spot across the entrance of the light pipe 25.

Figure 7A:
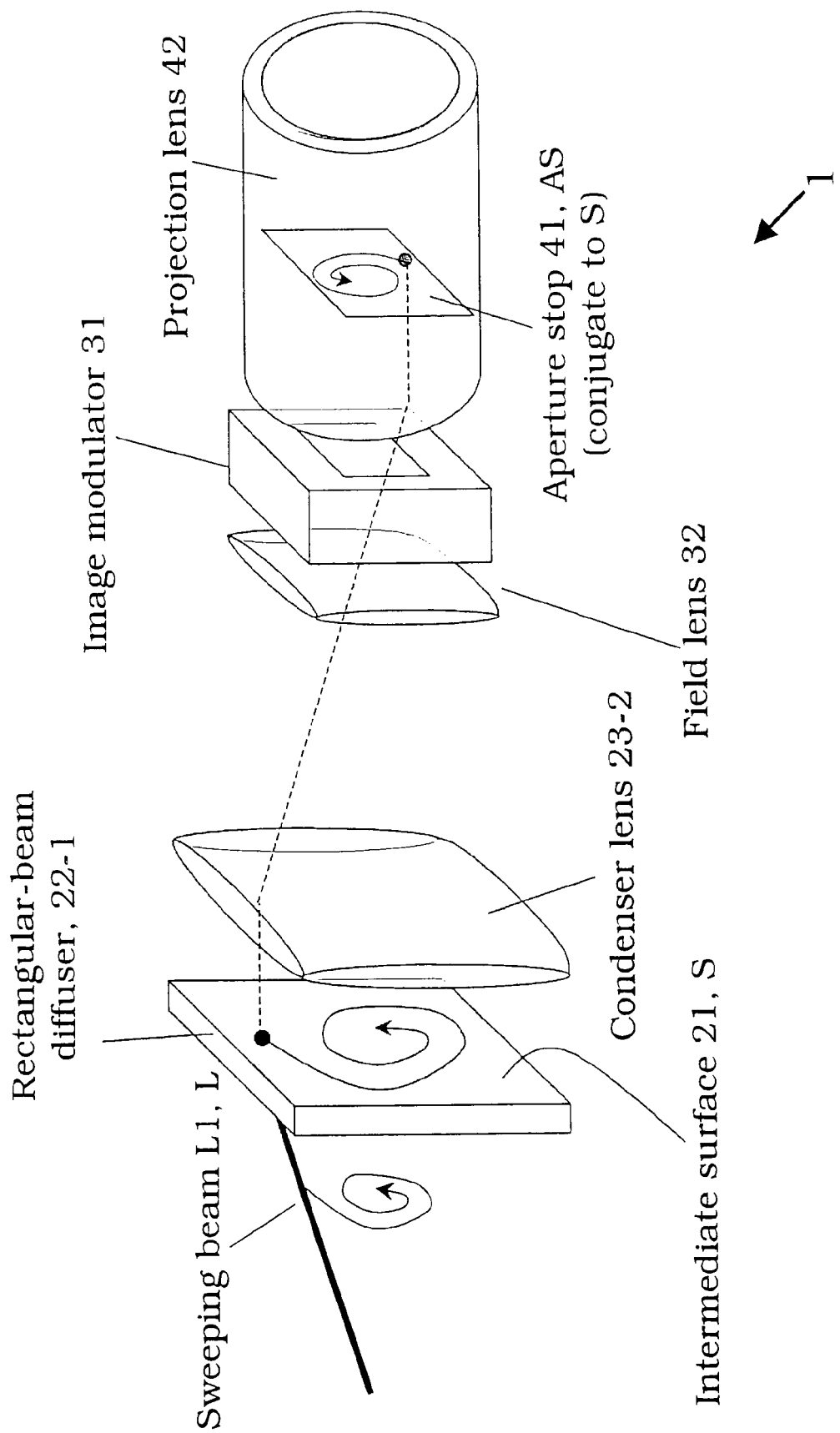
Figure 7B:
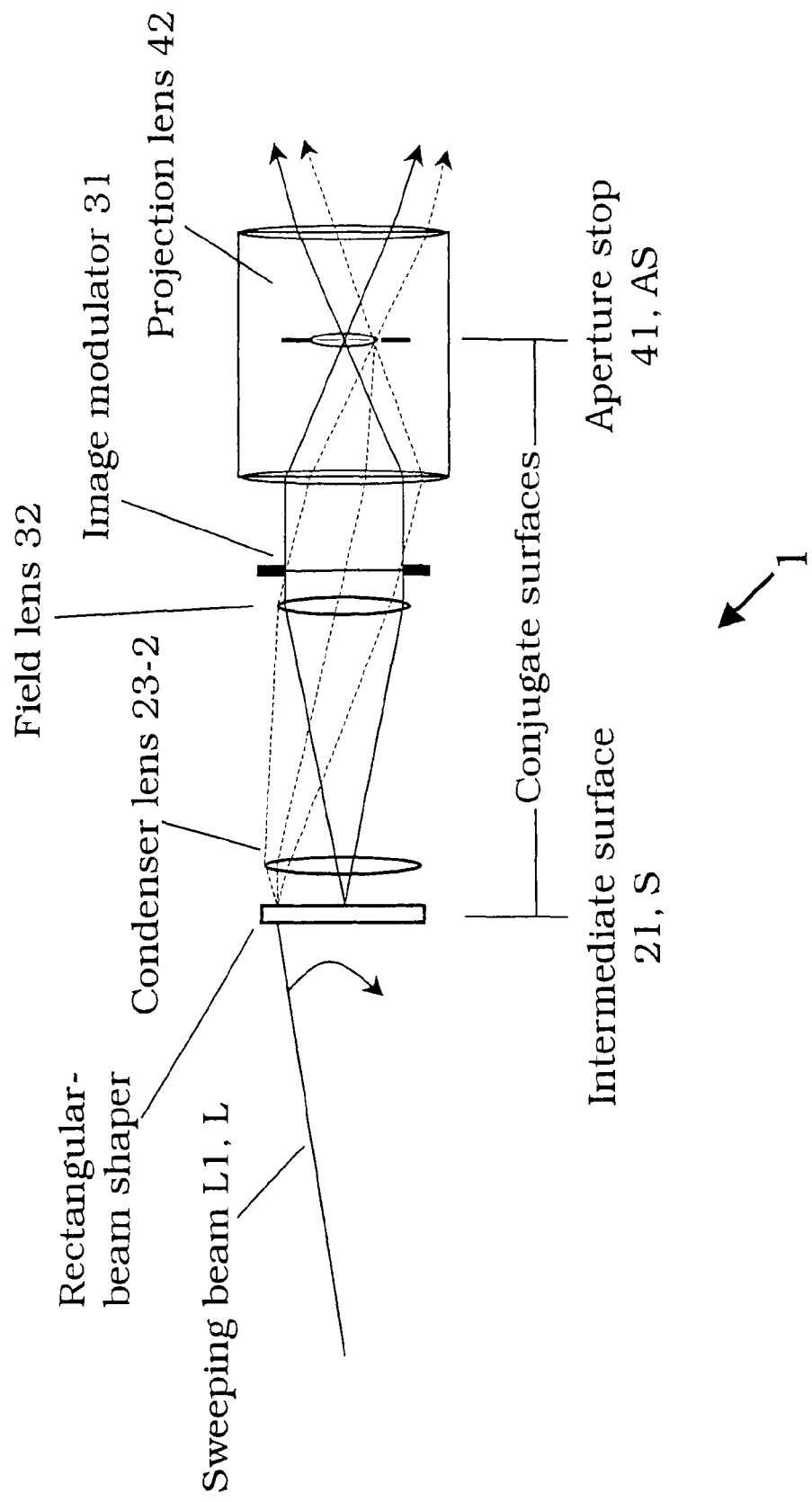
Figure 7C:
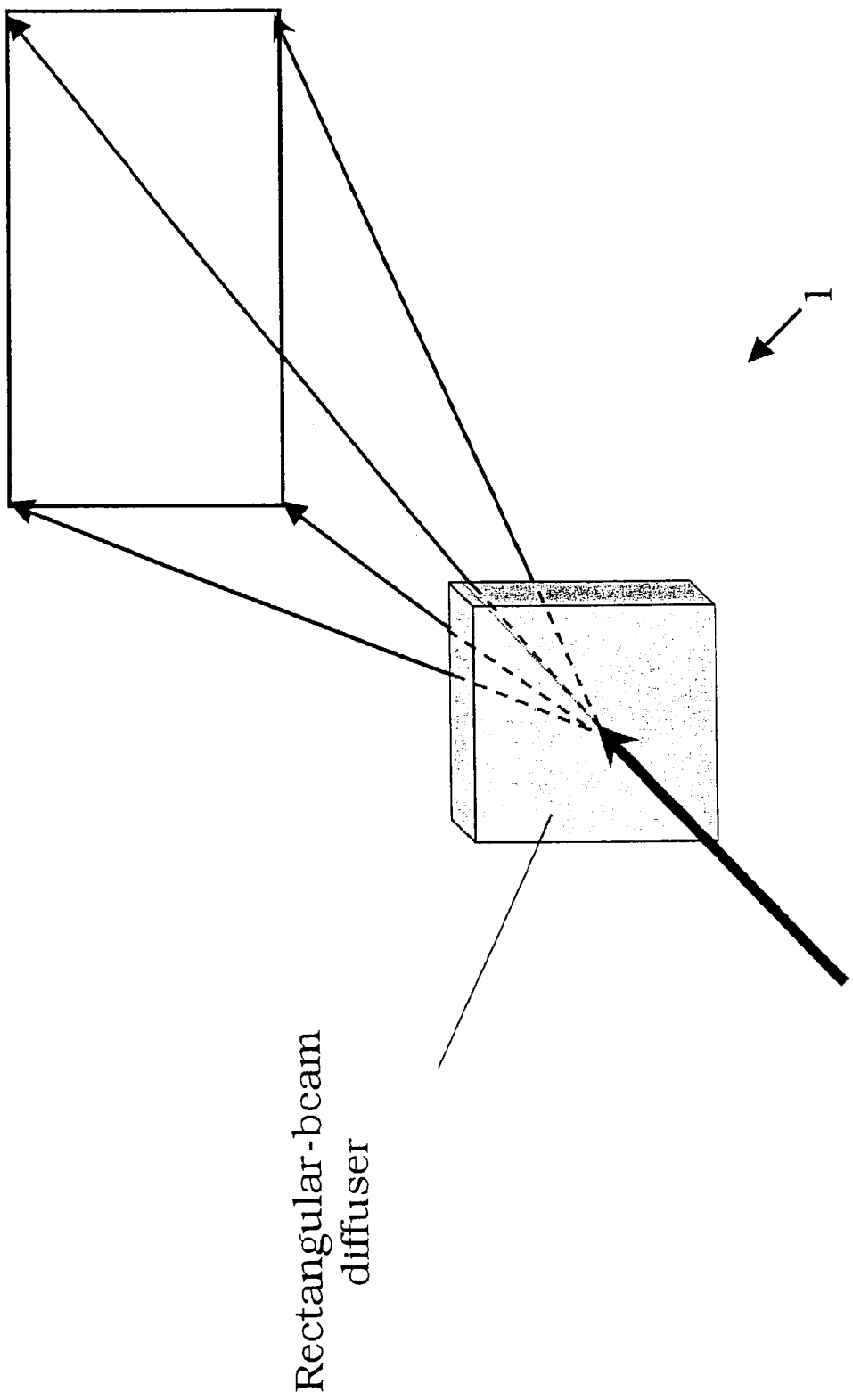

In the embodiment of FIG. 7A to 7C, a rectangular-beam diffuser 22-1 is involved which diffuses collimated light beams into a pyramidal solid angle.

It can be realized by a diffractive optical element of by a refractive element with a micro-structured surface and is known from prior art.

A rectangular-beam diffuser 22-1 is used to illuminate the image modulator 31 homogeneously and with rectangular shape.

A laser beam L or a set of multiple coincident laser beams or an array of laser beams is swept across the rectangular-beam diffuser 22-1 in such a way that it is partially or entirely covered. The rectangular-beam diffuser is in conjugate position to the aperture stop AS of the projection lens. As a result light sweeps in a similar (but inverted) way across the aperture stop like it sweeps across the rectangular-beam diffuser.

Figure 8:
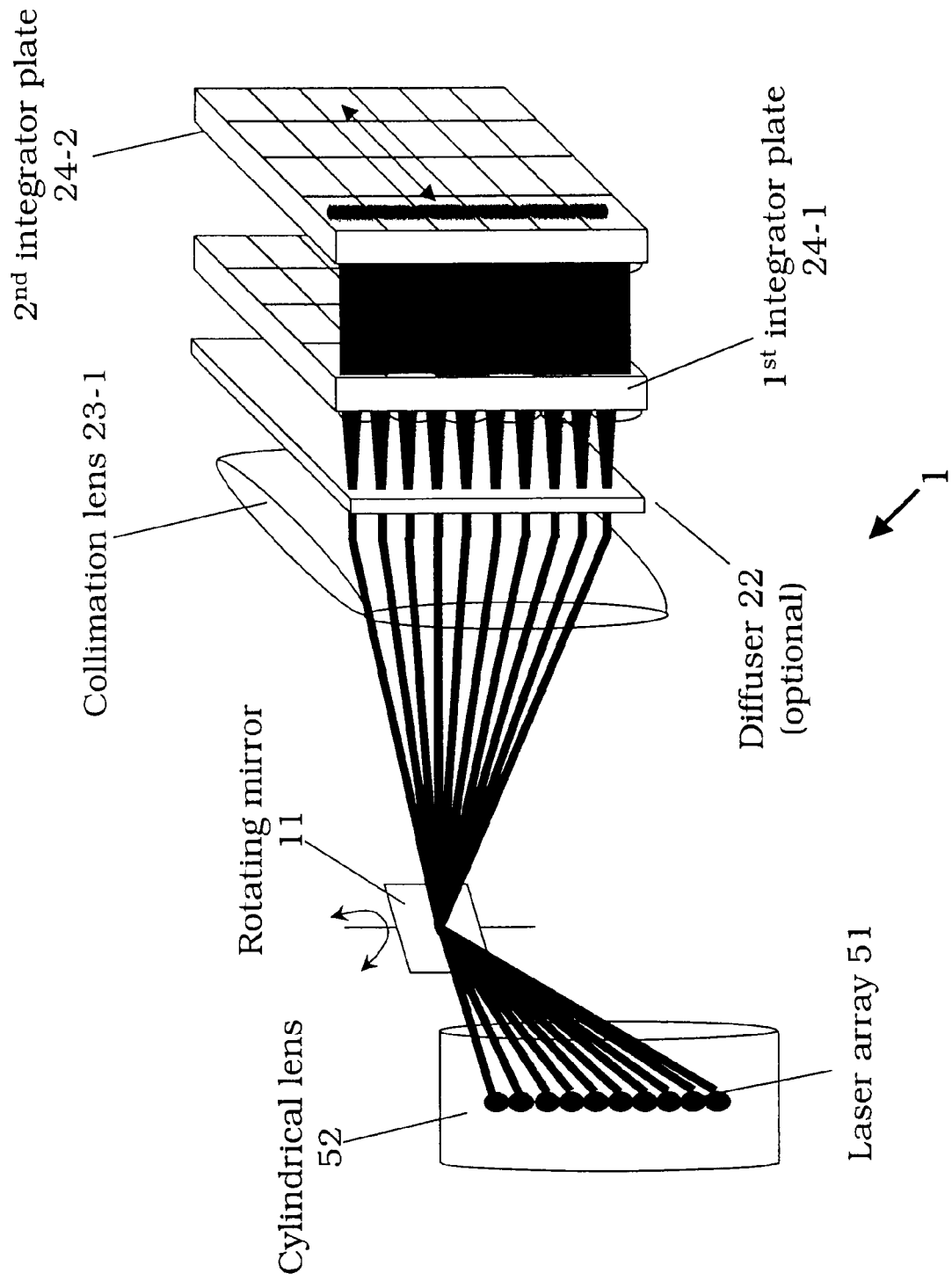
FIGS. 8, 9 are perspective side views showing details of further embodiments of image generating apparatuses according to the present invention.

According to FIG. 8, a laser beam array or a laser beam L with linear cross section or a set of multiple coincident lasers of that kind is focussed by a lens or alternatively a cylindrical lens 52 with axis perpendicular to the linear cross-section onto a mirror 11 which is rotating about an axis which is parallel to the linear cross-section. The rotation axis lies in the mirror plane.

The mirror 11 is rotating about that axis a few degrees from left to right, thereby sweeping the linear shaped laser beam across the $1^{st}$ integrator plate 24-1.

Optionally a diffuser 22 can be placed between the collimation lens 23-1 and the $1^{st}$ integrator plate 24-1 or between the mirror 11 and the collimation lens 23-1 to improve the uniformity.

Figure 9:
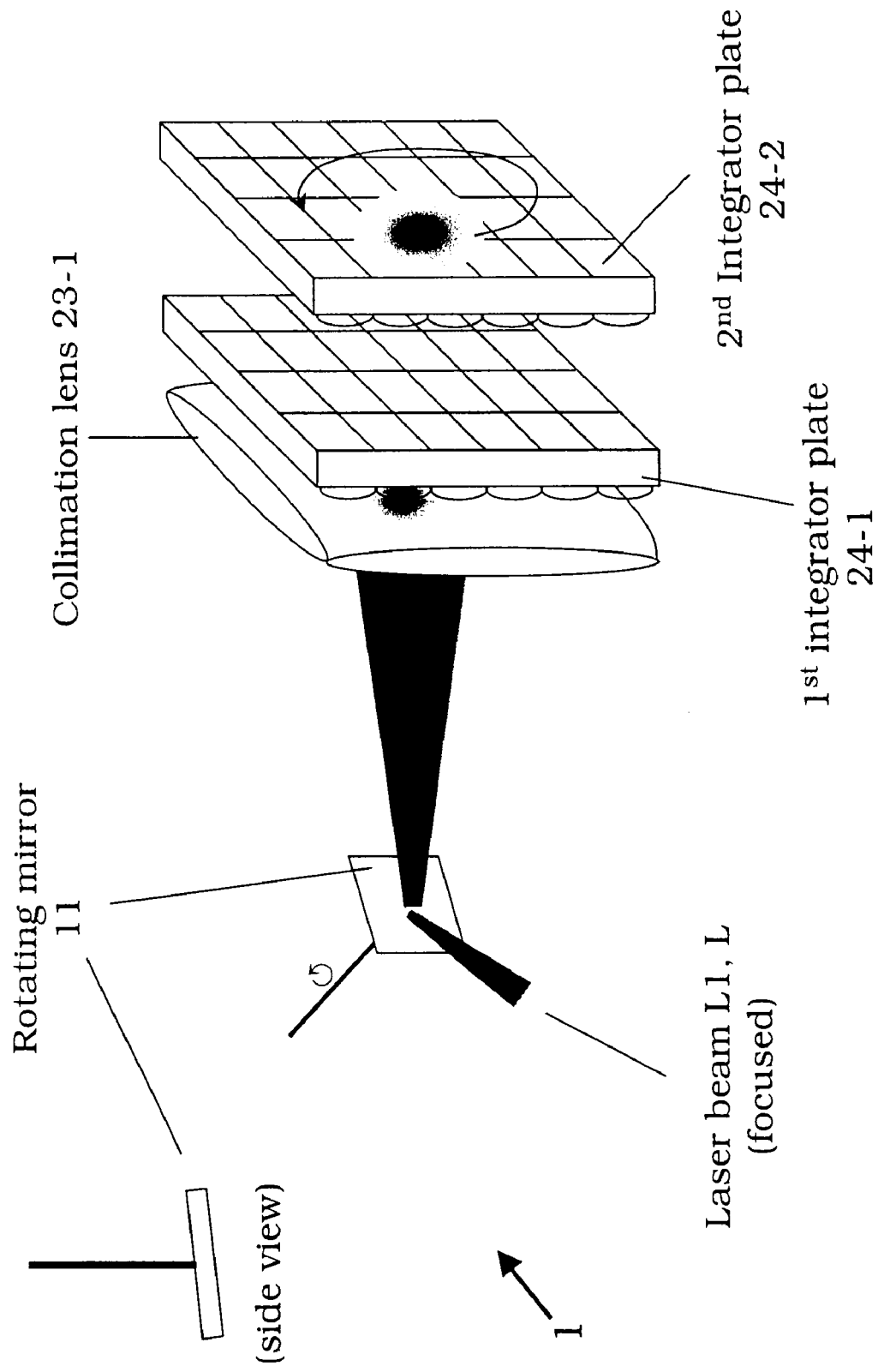

According to FIG. 9, a laser beam L or a set of multiple coincident laser beams or an array of laser beams is focussed by a lens onto a mirror 11 which is rotating about an axis, which is going through the centre of the mirror 11. The axis is tilted by a few degrees from the normal axis of the mirror plane, thereby the mirror is wobbling when rotated about the axis and deflecting the laser beam along a tapered surface. The geometrical dimensions are adapted in order that the surface of the $1^{st}$ integrator plate 24-1 is partially or completely covered by the circulating laser beam 1. An optional diffuser 22 can be placed preferably between the mirror 11 and the collimation lens 23-1 in order to blur the laser spot and to cover the $1^{st}$ integrator 24-1 in a more uniform way.

The present invention according to one aspect integrates laser light sources into known optical illumination architectures of micro-display type projectors.

The present invention inter alia also relates to an image generating apparatus 1 which comprises an illumination unit 20 having an intermediate face 21, S, as well as an image modulator 30 for generating an image I. In addition, a deflecting means 10 for deflecting a received light beam L of primary illumination light L1 to said illumination unit 20 is provided in order to irradiate said intermediate face 21, S. Said deflecting means 10 is adapted to have—during the process of irradiating said intermediate face 21, S—said light beam L subsequently in time irradiate different portions of said intermediate face 21, S in order to thereby reduce the speckle effect.

According to certain embodiments of the present invention one or a plurality of the following aspects may be essential for an projection type image generating apparatus, namely the provision of:
  an image generating panel,
  a projection lens, which projects the image displayed on the panel onto a screen,
  a light source, which illuminates the panel, and
  an illumination optical means, which modify the beam of the light source in order to illuminate the panel uniformly and with a beam shape congruent to the shape of the panel (generally rectangular shaped).

According to certain embodiments of the present invention essential means to be provided and measures to be taken for speckle reduction of an image generating apparatus using laser light may be based on the following:

Each Projection lens or optics PJ has a pupil with a certain diameter. This diameter together with the distance to the screen defines a maximum cone angle of a projected point. This cone angle of a projected point is essential for speckle reduction, if it is ensured that light at any two locations within this cone is incoherent to each other. In case of laser light sources such incoherency can be achieved, if a laser beam is sweeping across the pupil, thereby covering only a part of or the entire area of the pupil within a certain time. This ensures that light at any two locations within the pupil cannot interfere with each other, as light doesn't exist at any two disjunct locations at the same point of time.

According to certain embodiments of the present invention the illumination optics in a projection apparatus may have an intermediate surface S which is in conjugate position to the pupil of the lens. The term optical conjugation means that any location of the pupil is one-to-one mapped to a location in the intermediate surface S. As a result, a laser beam sweeping across the intermediate surface S is also sweeping across the pupil of the projection lens.

On the other hand, key features of other aspects of embodiments of the present invention can be summarized as follows: For speckle reduction it is—in these cases essential—to have (a) an suitable large cone angle and (b) incoherence of the light forming and projecting the images to be displayed.

Property (a) can be achieved by appropriately choosing and setting the finite size of the aperture stop with respect and in relation to the finite distance between the aperture stop and the intermediate face.

Property (b) can be achieved by employing the sweeping process of the used light beam with respect to the intermediate face.

In the following, reference is taken in detail to the Figs.:

FIGS. 1A and 1B are schematical block diagrams for elucidating basic aspects of embodiments of an image generating apparatus 1 according to the present invention.

In FIG. 1A the embodiment of the image generating apparatus 1 according to the present invention comprises means 50 for generating primary illumination light L1. Said primary illumination light L1 is generated by one or a plurality of laser light sources 51 or other light sources which are capable of at least in part producing primary illumination light L1 which at least to some extent has a coherence property. One or a plurality of light beams L are generated. Said primary illumination light L1 is generated and directed to a means 10 for deflecting said primary illumination light L1. Said means 10 for deflecting comprises at least one deflecting element 11. Said deflecting element 11 can be e.g. a mirror or any other deflecting entity, for instance a diffraction grating or the like. Said means 10 for deflecting and said deflecting element 11 are adapted in comprise means for changing the orientational relationship of the reflection face, interface, surface, or plane of said reflecting element 11 when compared to the orientation and direction of the incident light beam L of the primary illumination light L1 in time. Consequently, said means 10 for deflecting is capable of having said incident light beam L of said primary illumination light L1 left said means 10 for deflecting after reflection under temporally changing angle or orientational relation or direction. Consequently, said means 10 for deflecting and said deflection element 11 are adapted to have the deflected light beam L of primary illumination light L1 move around either continuously or by jumping to and/or between a discrete set of angular positions or orientations.

The deflection of said means 10 for deflecting and of said deflecting element 11 are controlled and chosen in order to have said light beam L of primary illumination light L1 irradiate different positions and/or portions of an illumination unit 20 as means 20 for illuminating an image generation device 30 as means 30 for generating an image and in particular an intermediate face, surface, interface, or plane 21, S comprised in said illumination unit 20 or means 20 for illuminating.

According to FIG. 1B, said illumination unit 20 as said means 20 for illuminating may comprise further optical elements such as lenses 23-1, 23-2 and some light integration/integrator means 24-1, 24-2. The light beam L of incident primary illumination light L1 is therefore modified and temporally and laterally split up into a bundle of beamlets $B_j$ which for each instant of time generate an image.

The speckle pattern generated by the beamlets are uncorrelated to each other as long as the lateral distance between each beamlet is sufficiently large. Additionally, the light of the beamlets is incoherent to each other as it exists not at the same point in time. Therefore, the individual speckle pattern generated by each beamlet superimpose on intensity basis, thereby reducing the speckle contrast of the superimposed image.

In FIGS. 1A and 1B a diffusing screen or face 22, S' is also shown. Such a diffusing screen 22, S' may be used to further increase the uniformity.

The diffusing screen can be also positioned at any position between 10 and 20.

After interaction with the illumination unit the incident primary illumination light L1 leaves the illumination unit 20 as secondary illumination light L2 in order to be directed to means 30 for image generation which comprises an image modulator 31, e.g. an LCD element which can be operated in transmission or in reflection.

After interaction with said means 30 for image generation and in particular with said image modulator 31 said incident secondary illumination light L2 leaves said image generating means 30 as tertiary imaging light L3 in order to be directed to the image projection means 40 or respective projection optics 40 which embodiment of FIG. 1 comprises a projection lens 42 with its aperture stop 41 in order to generate from said incident tertiary imaging light L3 projection light L3' conveying the image I to be projected to a screen and/or to an observer's eye.

According to FIGS. 1A and 1B, said aperture stop 41, AS may be a part of a projection lens 42 or an entity separated from a projections lens.

FIG. 2 is a schematical and perspective side view of another embodiment of an image generation apparatus 1 according to the present invention.

Again means 10 for deflecting a beam L of primary illumination light L1, an illumination unit 20 having an intermediate surface S, 21 and optional a diffuser screen 22, S', means 30 for generating an image I having an image modulator 31, and means 40 for projecting said image I as a projected image I' having an aperture stop AS, 41 and a projection lens 42 are provided which are positioned in a common optical path in this order in the direction of light propagation, i.e. from left to right in FIG. 2. In addition, FIG. 2 indicates that the intermediate face S, 21 and the face of the aperture stop AS, 41 are in optical conjugation with respect to each other, i.e. each portion irradiated on said intermediate face S, 21 is imaged on a respective portion of the face of the aperture stop AS, 41.

FIG. 3 is a schematical and perspective side view of details of said means 40 for projecting an image I of an embodiment of an image generating apparatus 1 according to the present invention.

FIG. 3 shows the geometrical relationship between different beamlets Bn and Bm which are created due to the movement of the incident light beam L of primary illumination light L1. It is shown that each beamlet Bj which is projected by said means 40 for projecting an image may create a specific speckle pattern in the observer's eye. If however, a minimal angular separation Δmin between two adjacent beamlets Bm an Bn is given which leads to a separation or at least to a non-overlapping relationship on the intermediate face S, 21 and accordingly on the face of the aperture stop AS, 41 when comparing the respective illuminated or irradiated portions thereof speckle pattern generated by the projected beamlets Bm and Bn become uncorrelated with respect to each other in the observer's eye.

Additionally, the light of the beamlets is incoherent to each other as it exists not at the same point in time. Therefore, the individual speckle pattern generated by each beamlet superimpose on intensity basis, thereby reducing the speckle contrast of the superimposed image.

FIGS. 4A to 4C again demonstrate the process of uncorrelating the beamlets Bj. In particular FIG. 4B shows in a front view the face of an aperture stop AS, 41 of said means 40 for projecting an image I. As the incident beam L of primary illumination light L1 is deflected and therefore swept across the intermediate face S, 21 of the illumination unit 20 or of said means 20 for illuminating thereby having the light beam L moved according to a particular trajectory T, irrespective and according trajectory occurs on the face of the aperture stop AS, 41. The shown beamlets B1, B2, . . . , Bi, . . . , Bn generate uncorrelated speckle pattern and loose their respective coherence property when compared to each other, if they do not overlap with respect to their irradiating portion of the respective intermediate face S, 21 or face of the aperture stop AS, 41. FIG. 4C again shows the temporal relationship of the beamlets Bi and the non-overlapping property with progress in time for time instances t1, . . . , ti, . . . , tN.

In FIGS. 5A and 5B by means of a perspective side view and a schematical and cross-sectional side view, a further embodiment of an image generating apparatus 1 according to the present invention is shown.

In this embodiment said means 20 for illuminating or said illumination unit 20 is formed by a sequence of a first collimation lens 23-1, a first integrator plate 24-1, a second integrator plate 24-2 and condenser lens 23-2. In this case said intermediate face S, 21 is formed as a part or a surface of the second integrator plate 24-2.

Said means 30 for image generation comprises a field lens 32 and a respective image modulator 31, LCD which operates in transmission.

In FIGS. 6A and 6B another embodiment for an image generating apparatus 1 according to the present invention is shown by means of a schematical and perspective side view and by means of a schematical and cross-sectional side view, respectively.

In this embodiment, said means 20 for illumination or said illumination unit 20 comprises an optional diffuser 22, S', a light pipe 25, a first lens 23-4 and a relay lens 23-3. In this case, said intermediate face S, 21 is formed as a part or a surface of said relay lens 23-3.

FIGS. 7A and 7B elucidate by means of a schematical and perspective side view and by means of a schematical and cross-sectional side view, respectively, a further embodiment of an image generating apparatus 1 according to the present invention.

The means 20 for illuminating or said illumination unit 20 in this case is formed by a rectangular beam diffuser 22-1, S' and by a condenser lens 23-2. In this case, said intermediate face S, 21 is formed as a surface or part of said rectangular beam diffuser 22, S'.

FIG. 8 demonstrates by means of a schematical and perspective side view that according to the present invention an array of laser units together with a cylindrical lens for focussing the multiplicity of beams irradiated from the laser array can be used as a light source. In this case said means 20 for illuminating or said illumination unit 20 comprises a collimation lens 23-1, a diffuser 22 and first and second integrator plates 24-1 and 24-2.

FIG. 9 demonstrates by means of a schematical and perspective side view the usage of a rotating mirror 11 as a part of said means 10 for deflecting.

REFERENCE SYMBOLS

1 image generating apparatus according to the present invention
10 means for deflecting an incident light beam, beam deflection means
11 deflecting element, mirror
11' deflecting element at tilted position
20 means for illuminating, illumination unit
21 intermediate face, intermediate surface, intermediate interface
22 diffuser, diffuser screen
22-1 rectangular beam diffuser
23-1 collimation lens
23-2 condenser lens
23-3 relay lens
23-4 lens
24 integrator plate
24-1 first integrator plate
24-2 second integrator plate
25 light pipe, light integration means
30 means for image generation
31 image modulator
32 field lens
40 means for projecting, projection optics
41 aperture stop
42 projection lens
50 means for generating primary illumination light, light source unit
51 light source, laser light source
52 cylindrical lens
AS aperture stop
B1, . . . , Bj, . . . beamlet
IO illumination optics
IP image generating panel
L light beam
LCD liquid crystal display element
L1 primary illumination light
L2 secondary illumination light
L3 tertiary illumination light
L3' projection light
PL projection lens, projection optics
S intermediate face, intermediate surface, intermediate interface
S' aperture stop

The invention claimed is:

1. An image generating apparatus, comprising:
an image generating panel;
illumination optical means having an intermediate face, said illumination optical means modifying beams of light in order to illuminate said panel uniformly and with a beam shape being congruent to the shape of said panel;
means for deflecting a received light beam of primary illumination light having coherence properties to said illumination optical means, in order to irradiate said intermediate face with said light beam; and
a projection lens configured to project an image received from said image generating panel, wherein
said intermediate face is a face of a diffuser of said illumination optical means,
said intermediate face of said illumination optical means is positioned in optical conjugation with respect to an aperture stop of said projection lens, and
said means for deflecting deflects, during a process of irradiating said intermediate face, said light beam so as to subsequently in time irradiate different portions of said intermediate face, and to sweep said light beam in two dimensions across a pupil of said projection lens, so that light at any two locations within the pupil of said projection lens is incoherent with respect to each other.

2. An image generating apparatus, comprising:
means for generating an image;
means for illuminating said means for generating an image having an intermediate face;
means for deflecting a received light beam of primary illumination light having coherence properties to said means for illuminating, in order to irradiate said intermediate surface with said light beam; and
means for projecting an image received from said means for generating said image, said means for projecting including an aperture stop, wherein
said intermediate face is a face of a diffuser of said means for illuminating,
said intermediate face of said means for illuminating is positioned in optical conjugation with respect to said aperture stop, and
said means for deflecting deflects, during said process of irradiating said intermediate face, said light beam so as to subsequently in time irradiate different portions of said intermediate face, and to sweep said light beam in two dimensions across a pupil of said means for projecting, so that light at any two locations within the pupil of said means for projecting is incoherent with respect to each other.

3. The apparatus according to claim 1 or 2,
wherein said means for deflecting has, during said process of irradiating said intermediate face, said light beam continuously move across said intermediate face.

4. The apparatus according to claim 1 or 2,
wherein said intermediate face is a surface of said means for illuminating or said illumination optical means.

5. The apparatus according to claim 1 or 2,
wherein said intermediate face is an interface of said means for illuminating or said illumination optical means.

6. The apparatus according to claim 1 or 2,
wherein said intermediate face is a virtual plane of said means for illuminating or said illumination optical means.

7. The apparatus according to claim 1 or 2, further comprising means for generating the primary illumination light, wherein
said means for generating the primary illumination light has a focal plane, and
said means for deflecting is positioned in vicinity to said focal plane.

8. The apparatus according to claim 1 or 2, wherein
said means for illuminating or said illumination optical means comprises a first and a second integrator plate and a condenser lens, and
said intermediate face is in vicinity of said second integrator plate.

9. The apparatus according to claim 1 or 2,
wherein said means for illuminating or said illumination optical means comprises a light pipe and a relay lens system, wherein the intermediate face is in vicinity to the aperture stop of the relay lens system.

10. The apparatus according to claim 1 or 2,
wherein said means for illuminating or said illumination optical means comprises an additional diffuser which is positioned before or after the deflecting means.

11. The apparatus according to claim 1 or 2,
wherein said means for deflecting is or comprises a mirror.

12. The apparatus according to claim 11,
wherein said mirror is configured to mechanically rotate in order to thereby deflect said received light beam across said intermediate face.

13. The apparatus according to claim 11,
wherein said mirror is mounted in a cardanic manner in order to be tilted around two orthogonal axes and in order to deflect said received light beam in two dimensions across said intermediate face.

14. The apparatus according to claim 11,
wherein said mirror is configured to have said deflected light beam move across said intermediate face in one of a circular manner, a linear manner, cyclical manner and chaotic manner.

15. The apparatus according to claim 1 or 2,
further comprising means for generating the primary illumination light and directing said primary illumination light to said means for deflecting said primary illumination light.

16. The apparatus according to claim 15,
wherein said means for generating primary illumination light has at least one laser light source.

17. The apparatus according to claim 15,
wherein said means for generating primary illumination light has an array of laser light sources, said means for generating said primary illumination light generating and directing a respective array of laser light beams to said means for deflecting said primary illumination light.

18. The apparatus according to claim 1 or 2,
wherein said means for generating an image or said image generating panel is or comprises an image modulator.

19. The apparatus according to claim 1 or 2,
wherein said means for generating an image or said image generating panel is or comprises at least one liquid crystal display element.

20. The apparatus according to claim 1 or 2,
wherein said means for illuminating or said illumination optical means is or comprises an illumination unit.

21. The apparatus according to claim 1 or 2,
wherein said means for deflecting has, during said process of irradiating said intermediate face, said light beam take different positions on said intermediate face.

* * * * *